(No Model.) 2 Sheets—Sheet 1.

D. G. LITTLEFIELD.
GRATE FOR STOVES OR FURNACES.

No. 390,242. Patented Oct. 2, 1888.

Witnesses:
S. B. Brewer
C. W. Tumlin

Inventor:
Dennis G. Littlefield,
by William N. Dow,
Attorney.

(No Model.) 2 Sheets—Sheet 2.

D. G. LITTLEFIELD.
GRATE FOR STOVES OR FURNACES.

No. 390,242. Patented Oct. 2, 1888.

Witnesses:
S. B. Brewer

Inventor:
DENNIS G. LITTLEFIELD,
by William H. Low
Attorney.

N. PETERS. Photo-Lithographer, Washington, D. C.

UNITED STATES PATENT OFFICE.

DENNIS G. LITTLEFIELD, OF ALBANY, NEW YORK.

GRATE FOR STOVES OR FURNACES.

SPECIFICATION forming part of Letters Patent No. 390,242, dated October 2, 1888.

Application filed July 29, 1886. Serial No. 209,381. (No model.)

*To all whom it may concern:*

Be it known that I, DENNIS G. LITTLEFIELD, of the city and county of Albany, in the State of New York, have invented new and useful Improvements in Grates for Cooking Stoves or Ranges, of which the following is a specification.

My invention relates to improvements in the fire-place bed for cooking stoves or ranges, in which it is necessary that all the fuel contained in the fire-places shall be brought into a complete state of ignition before they can be effective for broiling, boiling, frying, and baking, and where anthracite and other coal or crushed coke is used as fuel; and the object of my invention is to maintain a continuous fire, if so required, without dumping and cleaning out the fire-place, and to permit the fire to go out when so required, and afterward be able to start a new fire without emptying and cleaning out the fire-place, as required by all fire-places for cooking stoves or ranges heretofore constructed.

My objects are obtained by means of new combinations of the mechanical devices illustrated in the accompanying drawings herein referred to, and forming a part of this specification, in which—

Figure 3:
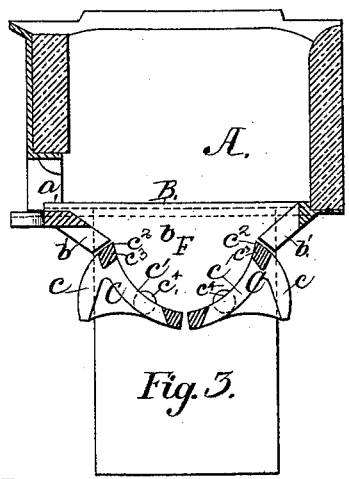
Figure 1:
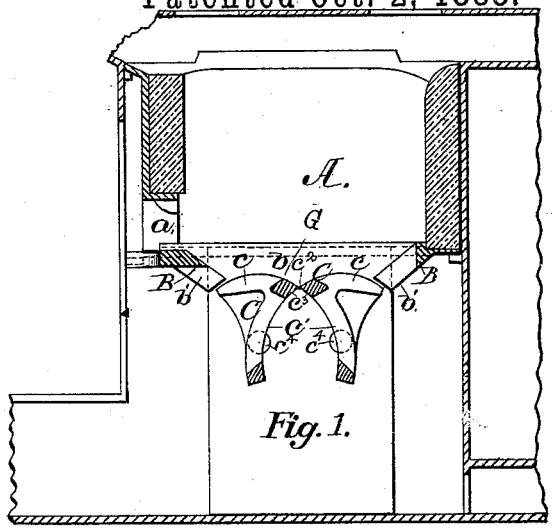
Figure 2:
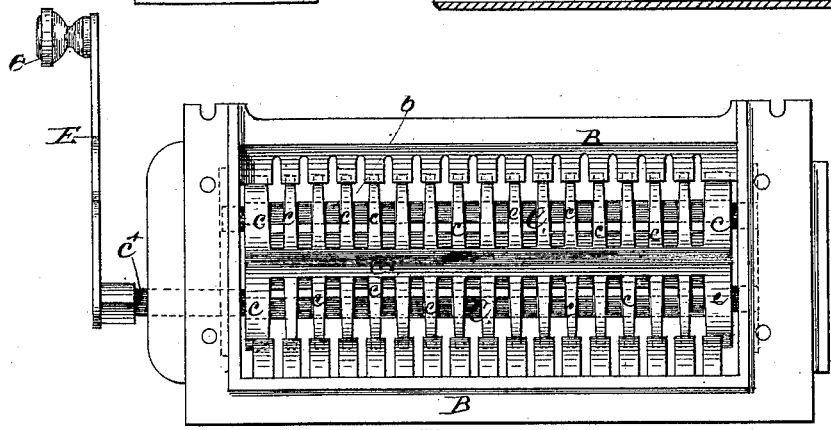
Figures 4, 7:
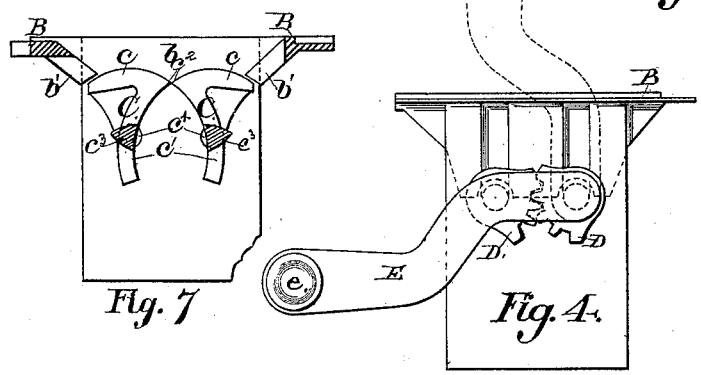
Figure 8:
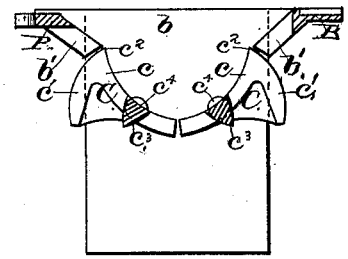
Figure 5:
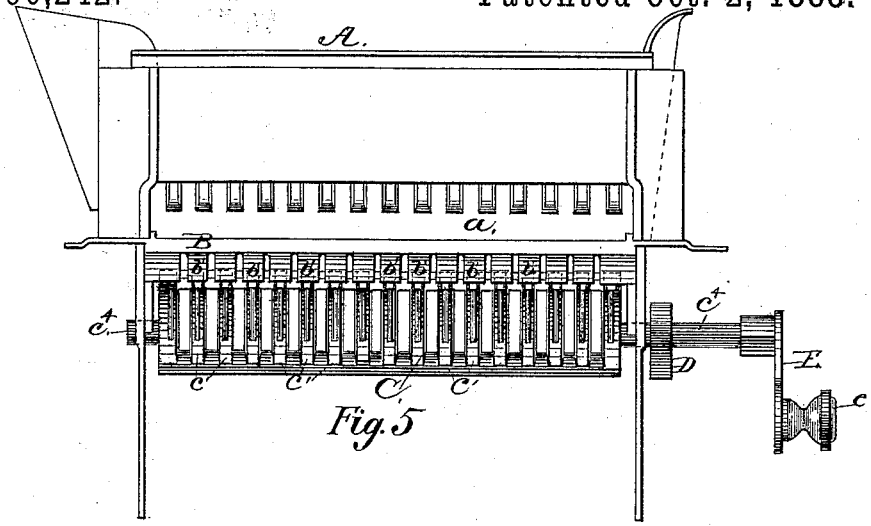
Figure 6:
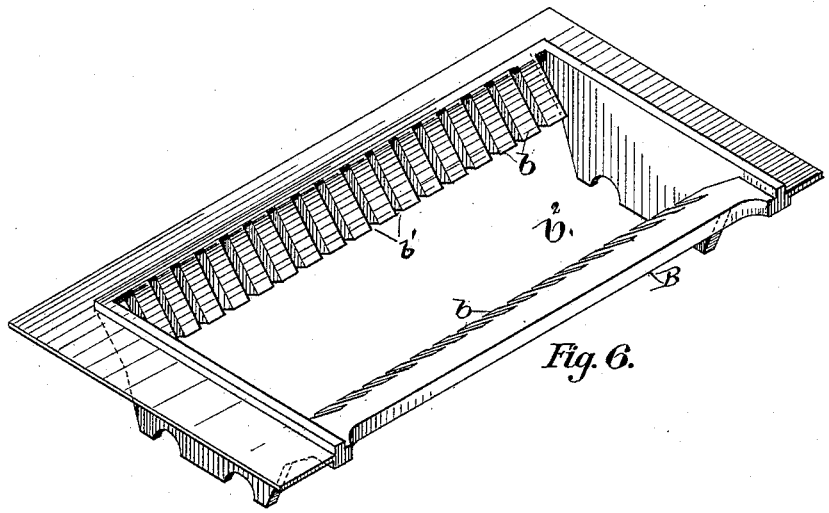

Figure 1 is a vertical section of the fire-place end of a cooking-range with two oscillatory concavo-convex grates turned to bring the central portion of the fire-bed to its highest position, as when used in combination with stationary side grates to form a large grate-surface, and a side opening, so that ashes and cinders can be removed from the lowest part of the fire-place. Fig. 2 is a plan of these grates as shown in Fig. 1 removed from the fire-place; Fig. 3, a vertical section of the fire-place detached from the range, showing the oscillatory concavo-convex grates turned to their lowest position, so as to form a pocket therein, to be used in combination with stationary side grates, for the purpose of keeping the fire over night or for a long period, or for the purpose of starting a new fire upon the remnants of an old fire after it has been permitted to go out; Fig. 4, an end elevation of these grates removed from the range, showing an arm and the gearing for operating the oscillatory grates and holding them in position as may be required; Fig. 5, a front elevation of the same; Fig. 6, a detached perspective view of the stationary grates; and Figs. 7 and 8 are vertical sections of a slightly-modified construction of the oscillatory concavo-convex grates.

In the drawings, A is the fire-box of a cooking range or stove, which fire-box is preferably made with an oblong form, and having its oppositely-located sides formed of any suitable material, as practiced by the trade. Through the front side of the fire-box is made a horizontal opening, $a$, for the purpose of admitting air to within the fire-box and for introducing a poker for operating with the coal, ashes, or clinkers, as occasion may require.

B is a stationary bottom plate, which supports the linings or fire-brick forming the sides of the fire-box. This stationary plate is made in the form of an oblong square frame, and has at its opposite sides the downwardly-inclined bars or fingers $b$, alternating with slots $b'$, as shown in Figs. 1, 2, and 6, and between these two series of slotted bars or fingers is the clear opening $b^2$. (Shown in Fig. 6.)

C C are oscillatory concavo-convex grates, which are mounted on trunnions and are suspended within the opening $b^2$ of the bottom plate, B, and relatively below the slotted bars or fingers $b$, as illustrated. These oscillatory grates are used in pairs, and each grate is substantially a duplicate of the other, and are each made to comprise a series of concave bars, $c$, and convex bars $c'$, which bars $c$ and $c'$ are connected together by being cast in one piece and connected at their points of junction $c^2$ with a longitudinal bar, $c^3$, as shown in Figs. 1 and 2, or connected in line with the trunnions $c^4$, as shown in Figs. 7 and 8. The trunnions $c^4$ of these oscillatory grates are suitably supported through the ends of the stove, and are provided at one end with two segmental gears, D D, which gears engage with each other to produce a simultaneous movement of the oscillatory grates C. One of the trunnions $c^4$ is preferably extended or has secured to it an arm which projects through the casting of the bottom plate and is provided with a lever or right-angular arm, E, by which these geared grates C C may be oscillated at will.

By the construction and arrangement of the bottom plate, B, and the oscillatory grates C C, as shown and above described, I am enabled to produce a grated bed to the fire-box A, which will be composed substantially of four parts—namely, of the two series of slotted fingers $b$ at the sides of the clear opening $b^2$ of plate B and the side walls of the fire-box A and the oscillatory grates C C—and these parts of the grate can individually contract and expand without affecting the other parts; and, further, by the above-described construction of parts there can be produced at will a grated fire-bed which will have substantially a level grated surface, which will have an extension from one side of the fire-box to the other, and with the parts (forming this grated surface) so situated that the incandescent coals lying on the upper side of any one of said parts will not be in a situation to contribute to the excessive heating of any of the other parts of this grate, and thereby rapidly burn out the same or contribute to effect a warping of the same.

At the will of an operator the oscillatory grates can have their members—the concave bars $c$ and the convex bars $c'$—changed in their situations relative to the grated bars or fingers $b$, so as to produce an extension of the vertical depth of the fire-box, as shown in Figs. 3 and 8, over that shown in Figs. 1 and 7, and this vertical extension will be downwardly from the plane of the lower ends of the fingers $b$ and relatively central between the two side walls of the fire-box A and in the opening $b^2$ in the plate B. This vertical extension of the fire-box A will operate as a receptacle for ashes and clinkers or partially-burned fuel to hold the same below the plane of the stationary fingers $b$, and thereby preserve to the fire-box A its full capacity for holding fuel in a state of combustion and substantially free from ashes or clinkers. When the oscillatory grates C C are turned so that their convex bars $c'$ are in a situation substantially together, as shown in Figs. 1 and 7, the depth of the fire-box A will be lessened from that last described, and in this position of these grates I prefer to start the first fire. When these grates C are in the position last described, the stationary grates $b$ and the bars $c$ of the oscillatory concavo-convex grates form a continuous fire-bed on nearly a level plane, so that a poker can be introduced into the fire-place through the side opening, $a$, for the purpose of removing ashes and slag from the lowest part of the fire-place, and the oscillatory concavo-convex grates C may have a slight vibratory motion imparted to them by the use of the arm E, and thereby ashes may be removed from the lowest part of the fire-place without disturbance to the burning fuel. Thus used, a stove or range can be used for an indefinite period and be as effective as when the fire was first started. To maintain the fire over night or in an active condition, the oscillatory concavo-convex grates must be turned to their lowest position, F, as shown in Fig. 3, whereby the pocket is formed for receiving the partially-burned fuel, clinkers, and other débris from the lowest part of the fire-place, when, by filling the fire-place A with fresh fuel and properly checking the draft leading from the range, the combustion will proceed in a slow and sluggish manner during the night or for a long period, air to support combustion entering into the fire-place through the side grates, $b$, and through the side opening, $a$. When not desirable to keep the fire over night, or for a long period, in an inactive condition, let it go out with the oscillatory concavo-convex grates in their highest position, G, Fig. 1; and to then start a new fire turn the oscillatory concavo-convex grates to their lowest position, F, Fig. 3, to form the pocket before mentioned to receive the débris from the old fire, level this off and start a new fire thereon, air to support combustion entering the fire-place through the stationary side grates, $b$, and through the side opening, $a$, the same as when keeping the fire over night or for a long period. Burning in this way for a time will produce a fire fully as effective as if started anew, when the oscillatory concavo-convex grates are in their highest position, and will so continue until all combustible matter contained in said pocket is consumed. This accomplished, by returning the oscillatory grates C to their highest position, G, Fig. 1, their sharp cutting-edges $c^2$ will remove the ashes, clinkers, and other débris from the lowest part of the fire-place, so as to leave a clean bright fire the same as when it is first started on the oscillatory concavo-convex grates, as combined with the side grates, $b$, to form a large grate-surface, and the horizontal openings $a$, through which ashes and clinkers can be removed from the lowest part of the fire-place.

Having described my invention, what I claim as new, and desire to secure by Letters Patent, is—

1. The combination, with the stationary bottom plate, B, constructed substantially as described, and having the clear opening $b^2$, relatively between the oppositely-located series of downwardly-inclined fingers $b$, alternating with slots, of the two oscillatory concavo-convex grates suitably connected, mounted on trunnions, and suspended within the opening of said bottom plate and relatively below said inclined fingers, substantially as and for the purposes set forth.

2. The combination, with the fire-box A, stationary bottom plate, B, at the lower end of said fire-box and having the clear opening $b^2$, and the inclined grated bars or fingers $b$, projecting relatively inwardly from the bottoms of the oppositely-located sides of said fire-box, of the concavo-convex grates C, suitably connected, mounted on trunnions, and suspended within the opening of said stationary bottom plate and relatively below the slotted fingers $b$, substantially as and for the purposes set forth.

DENNIS G. LITTLEFIELD.

Witnesses:
WM. H. LOW,
S. B. BREWER.